(12) United States Patent
Gibbs et al.

(10) Patent No.: US 8,346,047 B2
(45) Date of Patent: Jan. 1, 2013

(54) FIBER MANAGEMENT COMPONENT

(75) Inventors: Gary F. Gibbs, Wylie, TX (US); Gil Ruiz, McKinney, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 373 days.

(21) Appl. No.: 12/713,386

(22) Filed: Feb. 26, 2010

(65) Prior Publication Data

US 2011/0038590 A1 Feb. 17, 2011

Related U.S. Application Data

(60) Provisional application No. 61/233,558, filed on Aug. 13, 2009.

(51) Int. Cl.
*G02B 6/00* (2006.01)

(52) U.S. Cl. ......................... 385/138; 385/135

(58) Field of Classification Search .................. 385/135, 385/138
See application file for complete search history.

(56) References Cited

U.S. PATENT DOCUMENTS

| | | | |
|---|---|---|---|
| 4,330,172 A | 5/1982 | Monaghan | |
| 6,227,719 B1 * | 5/2001 | Aoki et al. | 385/59 |
| 6,331,079 B1 * | 12/2001 | Grois et al. | 385/53 |
| 6,435,728 B2 * | 8/2002 | Shimoji et al. | 385/56 |
| 6,485,192 B1 * | 11/2002 | Plotts et al. | 385/75 |
| 6,572,275 B2 * | 6/2003 | Shimoji et al. | 385/76 |
| 6,984,073 B2 * | 1/2006 | Cox | 385/55 |
| 7,076,144 B2 * | 7/2006 | Loder et al. | 385/134 |
| 7,690,848 B2 * | 4/2010 | Faika et al. | 385/59 |
| 2002/0106162 A1 | 8/2002 | Loder | |
| 2005/0281509 A1 * | 12/2005 | Cox et al. | 385/59 |

FOREIGN PATENT DOCUMENTS

| | | |
|---|---|---|
| EP | 0 961 144 A1 | 12/1999 |
| EP | 1 107 368 A2 | 6/2001 |
| EP | 1 462 836 A2 | 9/2004 |

* cited by examiner

*Primary Examiner* — Ryan Lepisto

(74) *Attorney, Agent, or Firm* — Muncy, Geissler, Olds & Lowe, PLLC

(57) ABSTRACT

A fiber management component includes a housing having an interior, a floor in the interior and a first wall having an aperture communicating with the interior. A platform is connected to the housing, which platform has a first portion with a bore that has a first end facing the aperture and a second portion forming a channel extending toward the bore. The channel is configured to releasably secure a spring push of a fiber optic connector to the platform and the bore is configured to slidably support a ferrule of a fiber optic connector.

17 Claims, 3 Drawing Sheets

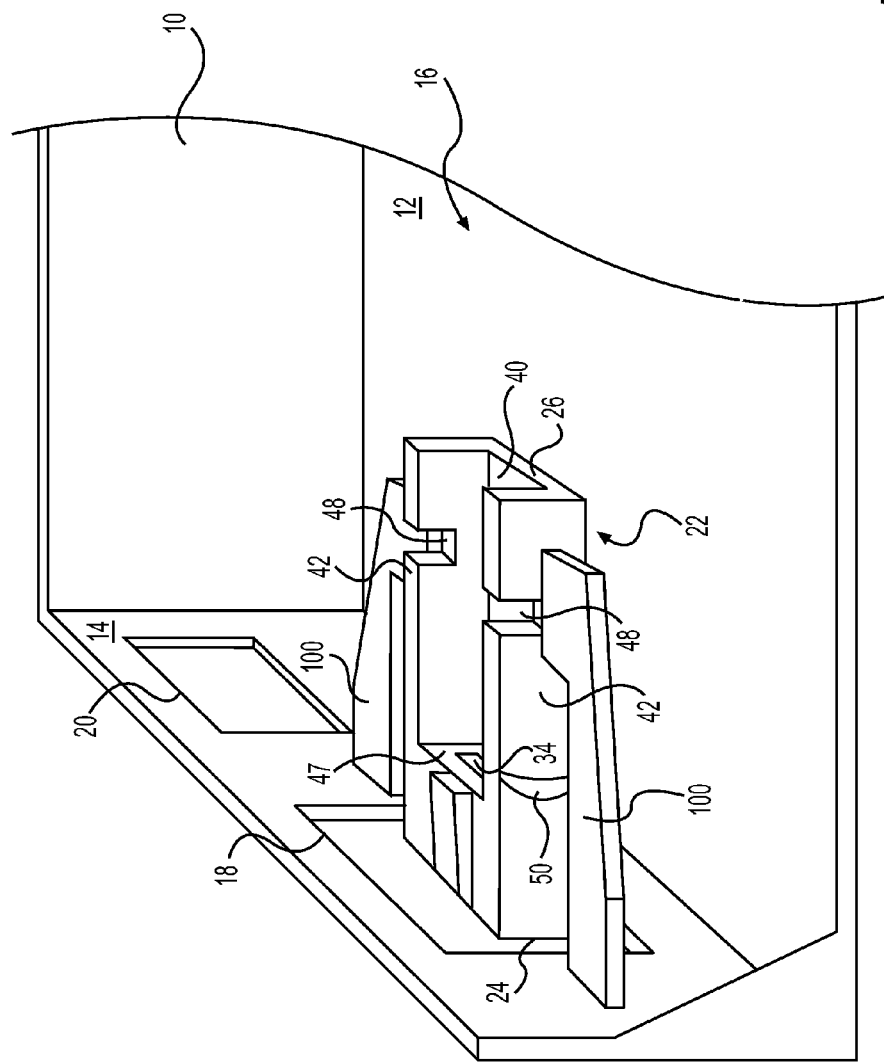

FIBER MANAGEMENT COMPONENT

CROSS-REFERENCE TO RELATED APPLICATIONS

The present application claims the benefit of U.S. Provisional Patent Application No. 61/233,558, filed Aug. 13, 2009, the entire contents of which is hereby incorporated by reference.

FIELD OF THE INVENTION

The present invention is directed toward a fiber management component that includes a housing having a built-in support for holding a first portion of an optical fiber connection element and a second optical fiber connection element, and, more specifically, toward a fiber management component having a built-in support having a first receiver for slidably receiving a ferrule and a second receiver for releasably securing a spring push.

BACKGROUND OF THE INVENTION

A known type of optical fiber management component is connectable to a trunk cable and includes a plurality of adapters having female receptacles. Multiple optical fibers from the trunk cable are fanned out inside the component and individually connected to the adapters. Male connectors can be plugged into the female receptacles to form a connection between a fiber optic cable attached to the male connector and one of the fibers of the trunk cable.

A modular fiber optic management component that may be mounted on a panel in a rack is sold under the trade name InstaPATCH by the assignee of the present application. This component is essentially a metal or plastic case in which a fan-out assembly is mounted. The fan-out assembly is a fixture constructed to hold a fan-out cable in a desired configuration with one connectorized end in a position to connect to a trunk cable and with connectors terminated on the side with the individual optical fibers ready to be connected to adapters. The fixture keeps the fibers organized and substantially prevents them from exceeding their minimum bend radius. The fixture also includes an opening for receiving an adapter which connects the end of the trunk cable to the end of the fan-out cable in the management component.

FIG. 5 illustrates a conventional fan-out cable 500 having a connector 502 for connecting the fan-out cable 500 to another fiber optic cable, such as a trunk cable (not shown). The connector 502 includes a housing 504 having an inner housing portion 506 and an outer housing portion 508, which inner housing portion 506 supports a ferrule 510. The ferrule 510 includes narrow body portion 514 and a wide body portion 516 meeting the narrow body portion at a shoulder 518 which shoulder 518 abuts an inner wall of housing 504 leaving an end portion 520 of the ferrule 510 and two alignment pins 522 exposed outside the housing 504.

Fan-out cable 500 comprises a plurality of individual optical fibers 524 that form a bundle 526 which connects to ferrule 510. The ferrule 510 holds the optical fibers with their end faces exposed on one end of the ferrule to facilitate a connection with the optical fibers of a similar ferrule positioned against ferrule 510. A spring 527 surrounds the bundle 526, and a spring push 528 having a body portion 530 and first and second flexible arms 532 having barbed ends 534 is connected to the bundle 526. The barbed ends 534 of the flexible arms 532 engage openings 536 in the housing 504 to secure the fan-out cable 500 to the housing 504. When connected in this manner, spring 527 is compressed between the body portion 530 of spring push 528 and an end of ferrule 510 and biases the ferrule 510 against the housing 504.

To connect ferrule 510 to a second ferrule in a second connector (not illustrated), the connectors are placed into openings on opposite ends of an adapter which holds the ends of the two ferrules (and the exposed optical fibers on the ferrules) against one another. Ferrule 510 is slidably mounted in inner housing portion 506, and can be slid into housing 504 to accommodate slight axial mismatches when two connectors are placed into an adapter. This compresses spring 527 and flexes bundle 526, but does not interfere with the use of the optical fibers. Outer housing portion 508 includes first and second flexible members 538 which can be pressed into outer housing portion 508 against barbed ends 534 of spring push 528 to push the barbed ends 534 out of openings 536 and thereby release spring push 528 from the housing 504.

The connector at the end of a fan-out cable contributes significantly to the cost of the fan-out cable, and the cost of the connector body of the connector is a significant portion of the cost of the connector. It would therefore be desirable to reduce the cost of fan-out cables and connectors therefore while still providing for efficient connections between optical cables, such as fan-out cables and trunk cables, at a fiber management device.

SUMMARY OF THE INVENTION

These problems and others are addressed by embodiments of the present invention, a first aspect of which comprises a fiber management component that includes a housing having an interior, a floor in the interior and a first wall having an aperture communicating with the interior. A support is supported by the housing floor and has first and second elongated guide members extending toward the aperture. The first and second elongated guide members define a first receiver for slidably supporting a fan-out cable ferrule and a second receiver for releasably receiving a fan-out cable spring push.

Another aspect of the invention comprises a fiber management component that includes a housing having an interior, a floor in the interior and a first wall having an aperture communicating with the interior. A platform is connected to the housing and has a first portion having a bore with a first end facing the aperture and a second portion comprising a channel extending toward the bore, the channel being configured to releasably secure a fan-out cable spring push to the platform.

A further aspect of the invention comprises a fiber management device that includes a housing having an interior, a floor in the interior and a first wall having an aperture communicating with the interior, where the floor includes a connector arrangement for slidably supporting a ferrule and for engaging a spring push.

BRIEF DESCRIPTION OF THE DRAWINGS

These and other aspects of embodiments of the invention will be better understood after a reading of the following detailed description together with the attached drawings wherein:

FIG. 4 is a perspective view of a fiber management device according to another embodiment of the present invention.

DETAILED DESCRIPTION

Figure 1:
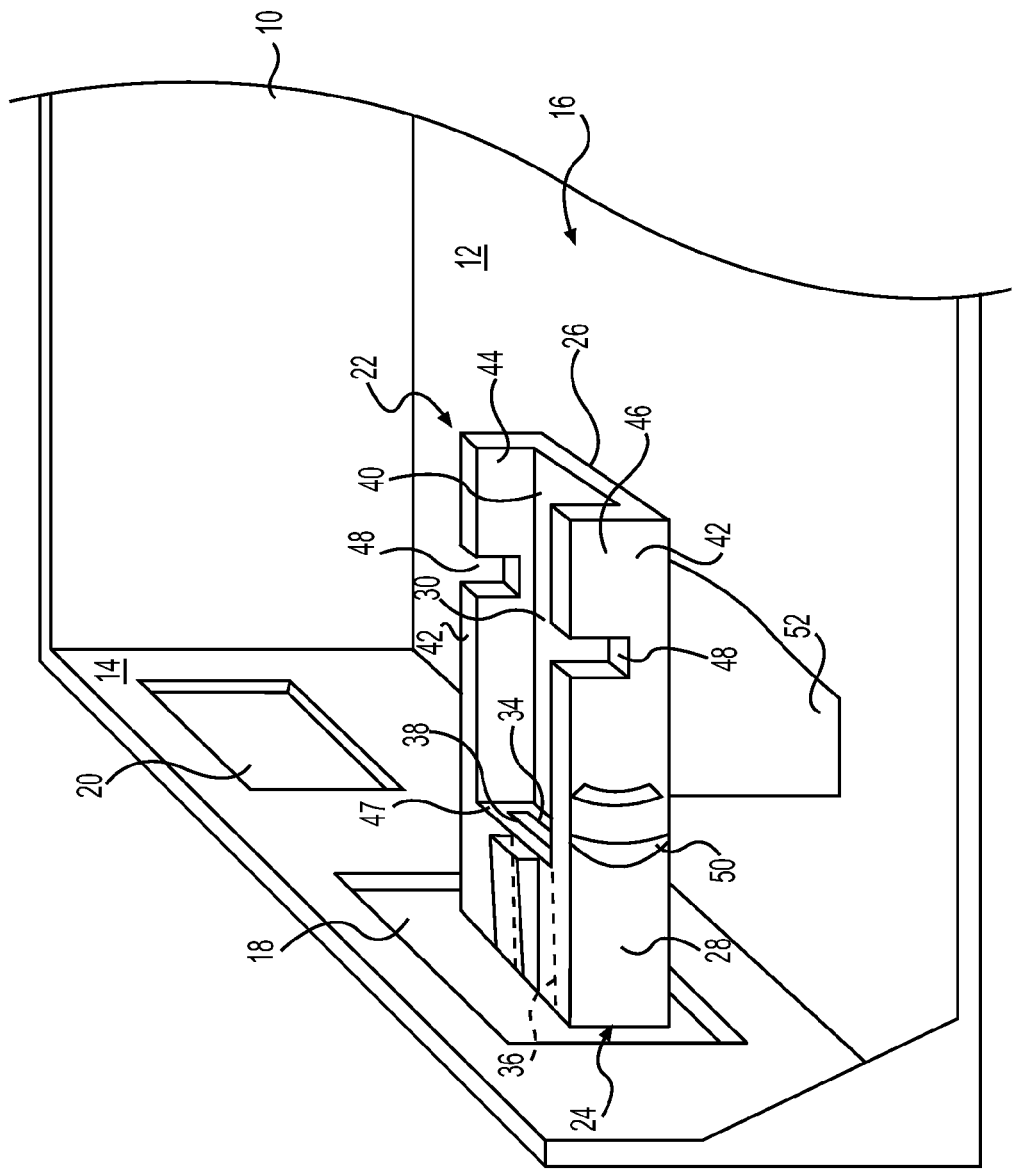
FIG. 1 is a perspective view of a fiber management device according to an embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 illustrates a portion of a fiber management component comprising a housing 10 with a floor 12 and a rear wall 14 in an interior 16 of the housing 10. The rear wall 14 includes a first aperture 18 and a second aperture 20. A support 22 is mounted in the interior 16 on floor 12 and has a first end 24 proximate first aperture 18 and a second end 26 longitudinally spaced from first end 24 in housing interior 16. A first receiver 28 is provided at first end 24 of support 22 and a second receiver 30 is provided at second end 26 of support 22. First receiver 28 comprises a bore 34 having a first end 36 at first end 24 of the support 22 and a second end 38 facing the second end 26 of support 22. Second receiver 30 comprises a channel 40 having first and second sidewalls 42 having inner sides 44 and outer sides 46 which channel 40 extends from an end wall 47 surrounding the second end 38 of bore 34 to the second end 26 of support 22. Sidewalls 42 each include a notch 48 spaced from the second end 26 of support 22, and protrusions 50 on their outer sides 46. A web 52 supports support 22 on floor 16 such that first end 24 of support 22 is directed toward first aperture 18. An additional support substantially identical to support 22 may be, and generally would be, provided in front of second aperture 20, but is omitted in FIG. 1 for clarity of illustration.

Figure 2:
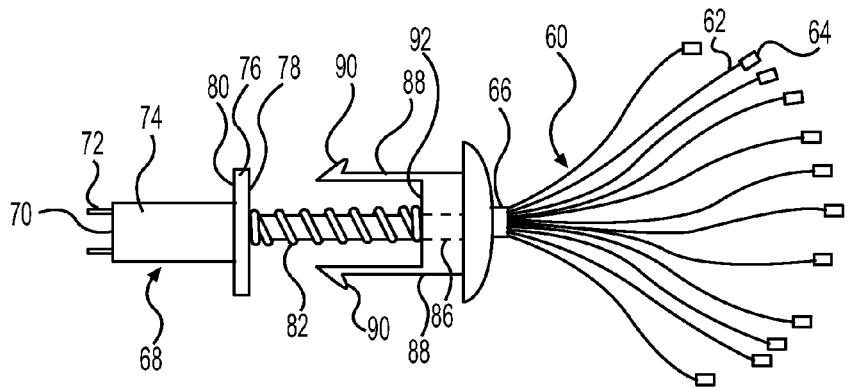
FIG. 2 is an elevational view of a portion of a fan-out cable connector including a ferrule and a spring push.

FIG. 2 illustrates a fan-out cable 60 that can be mounted to support 22 as discussed further below. Fan-out cable 60 comprises a plurality of individual optical fibers 62 having terminal connectors 64 which optical fibers 62 are joined to form a bundle 66. The bundle 66 is connected to a ferrule 68 in a conventional manner so that the end faces (not illustrated) of the individual fibers 62 are exposed at an end face 70 of ferrule 68 for connection to fibers at an end face of a second ferrule (not illustrated) held against ferrule 68 by an adapter (not illustrated). Two alignment pins 72 project from end face 70 of ferrule 68 which mate with openings in a second ferrule to properly align the first and second ferrules and their associated optical fibers. Ferrule 68 has a narrow portion 74 and a wide portion 76 at a second end 78 opposite end face 70 which wide portion 76 forms a shoulder 80 where it joins to narrow portion 74. A spring 82 is placed over bundle 66 before it is connected to ferrule 68, and a spring push 84 is secured to bundle 66.

Spring push 84 comprises a body portion 86 that slidably attaches to bundle 66. First and second flexible legs 88 extend from body portion 86 each of which flexible legs 88 terminates in a barbed end portion 90. A push wall 92 on body portion 86 between the flexible legs 88 engages spring 82 when the fan-out cable 60 is connected to support 22.

Figure 5:
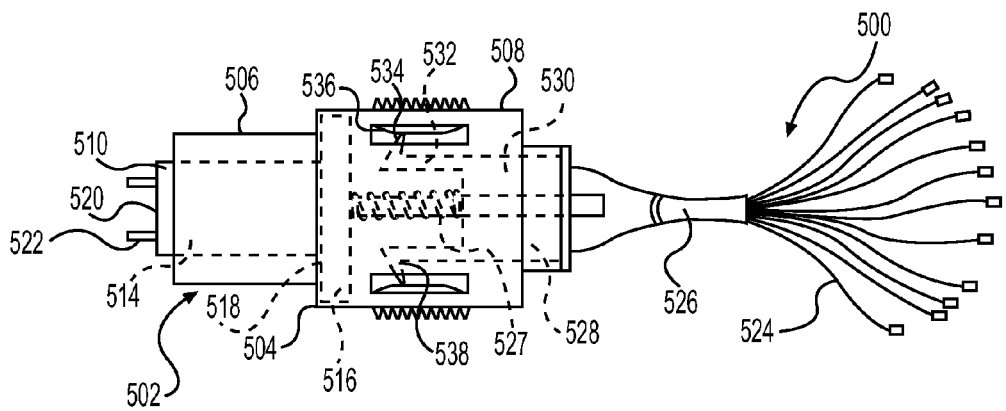
FIG. 5 is an elevational view of a conventional fan-out cable connector having a connector housing.

Fan-out cable 60 has some elements in common with the conventional fan-out cable 500 illustrated in FIG. 5; however, unlike a conventional fan-out cable, fan-out cable 60 does not include a connector housing. Instead, fan-out cable 60 is connectable to support 22 in the housing 10 of the fiber management component. Eliminating the connector housing from the fan-out cable 60 reduces the cost of the fan-out cable and reduces the number of discrete elements that require assembly in a fiber management component.

The connection of fan-out cable 60 to the support 22 of FIG. 1 will now be described with reference to FIG. 3. The ferrule 68 of the fan-out cable 60 is placed into channel 40 of support 22 and moved into bore 34 until the wide portion 76 of the ferrule 68 abuts against end wall 47 of channel 40. The length of narrow portion 74 of ferrule 68 is selected so that end face 70 and alignment pins 72 of ferrule 68 project slightly from the first end 36 of the bore 34. As ferrule 68 moves into first receiver 28, bundle 66 and spring 82 enter the channel 40 followed by the barbed end portions 90 of the first and second flexible legs 88 of spring push 84. The angled ends of the barbed end portions 90 engage the inner sides 44 of channel side walls 42 and force the first and second flexible legs 88 toward each other as the spring push 84 moves toward the second end 38 of the first receiver 28. The wide portion 76 of ferrule 68 engages end wall 47 of channel 40 before the barbed end portions 90 of the flexible legs 88 of the spring push 84 reach the first and second notches 48 of the sidewalls 42. As spring push 84 is moved further along, the spring 82 is compressed between the second end 78 of ferrule 68 and the push wall 92 of the spring push 84. When the barbed end portions 90 of the flexible legs 88 reach notches 48 in the sidewalls 42 of the channel 40, the flexible legs 88 flex away from one another as the barbed end portions 90 enter the notches 48 thereby securing the fan-out cable 60 to the support 22.

Ferrule 68 is spring biased against end wall 47 of the channel 40, but can move toward second end 26 of support 22 if a force is applied against the end face 70, such as when end face 70 is being pressed against the mating face of a second ferrule (not illustrated). Thus, the ability to accommodate slight axial mismatch between two connectors placed in an adapter is maintained. Protrusions 50 are provided on the outer sides 46 of sidewalls 42 to engage a suitable adapter (not illustrated) for connecting the fan-out cable 60 to a trunk cable (not illustrated).

Figure 3:
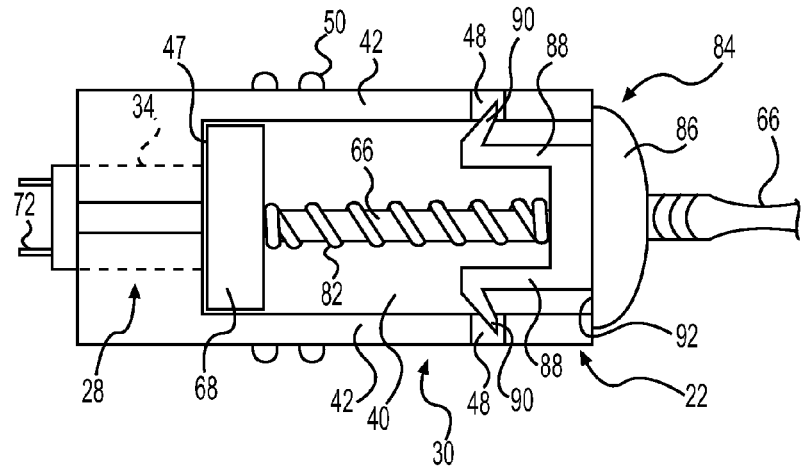
FIG. 3 is a top plan view of a portion of the fiber management device of FIG. 1 with the fan-out cable of FIG. 2 connected thereto.

FIG. 4 illustrates another embodiment of the present invention in which the same reference numerals are used to identify elements common to the embodiment of FIGS. 1-3. In this embodiment, support 22 is connected to rear wall 14 of housing 10 by first and second support arms 100, thereby removing the need for web 52 and providing additional space beneath support 22 for possible fiber management use.

The present invention has been described herein in terms of presently preferred embodiments. However, modifications and additions to these embodiments will become apparent to those of ordinary skill in the relevant art upon a reading of the foregoing description. It is intended that all such additions and modifications comprise a part of the present invention to the extent they fall within the scope of the several claims appended hereto.

We claim:

1. A fiber management component comprising:
a housing having an interior, a floor in the interior and a first wall having an aperture communicating with the interior; and
a support supported by the floor and having first and second elongated guide members extending toward said aperture, said first and second elongated guide members defining a first receiver configured to slidably receive a ferrule and a second receiver configured to releasably receive a spring push,
wherein said first and second elongated guide members comprise first and second elongated side members and wherein said support includes a platform connected to said first and second elongated side members, said platform including a first portion comprising a part of said first receiver and a second portion comprising a part of said second receiver, and
wherein said support includes a web extending from said floor to said platform.

2. The fiber management component of claim 1 wherein said support is integrally formed with said floor.

3. The fiber management device of claim 1 wherein said first receiver comprises a bore having a first end facing said aperture and a second end facing said second receiver, said second end surrounded by a wall forming a stop for said ferrule.

4. The fiber management device of claim 1 wherein said first receiver is spaced from said first wall.

5. The fiber management device of claim 1 including a ferrule slidably supported in said first receiver, a spring push releasably secured to said second receiver and a spring between said ferrule and said spring push biasing said ferrule against said first receiver.

6. The fiber management device of claim 1 wherein said first and second elongated side members each includes a first surface and a second surface, wherein the first surface of the first elongate side member faces the first surface of said second elongate side member, said second surfaces each including a projection configured to engage an adapter mountable in the aperture.

7. The fiber management component of claim 1 wherein said second receiver is topless.

8. The fiber management component of claim 1, wherein said first receiver has a longitudinal axis and is configured to receive the ferrule in an axial direction and wherein the second receiver is configured to receive the spring push in a direction different than the axial direction.

9. A fiber management component comprising:
a housing having an interior, a floor in the interior and a first wall having an aperture communicating with the interior; and
a platform connected to the housing, the platform comprising a first portion having a bore having a first end facing the aperture and a second portion comprising a topless channel extending toward the bore, the channel being configured to releasably secure a spring push to the platform,
wherein said channel comprises a bottom wall and first and second opposed side walls, at least one of said side walls including a receiver for releasably securing the spring push to the platform.

10. The fiber management device of claim 9 wherein said first and second side walls each include a notch configured to receive a portion of the spring push.

11. The fiber management device of claim 9 including a web extending from the floor to the platform, said web supporting said platform relative to said housing.

12. The fiber management device of claim 9 wherein said platform is integrally formed with said housing.

13. The fiber management device of claim 9 including a ferrule slidably mounted in said bore, a spring push releasably secured to said channel and a spring between said ferrule and said spring push biasing said ferrule against a second end of said bore.

14. The fiber management device of claim 9 wherein said platform is spaced from said first wall.

15. A fiber management device comprising:
a housing having an interior, a floor in the interior and a first wall having an aperture communicating with the interior, said floor including support means for slidably supporting a ferrule and for engaging a spring push.

16. The fiber management device of claim 15 wherein said support means comprises a platform having a bore for slidably supporting the ferrule and a channel for slidably receiving the spring push.

17. The fiber management device of claim 16 including a ferrule slidably mounted in said bore, a spring push engaging said channel and a spring connected between said spring push and said ferrule biasing said ferrule against an end surface of said bore.

* * * * *